Patented May 27, 1952

2,598,639

UNITED STATES PATENT OFFICE 2,598,639

LOW MOLECULAR WEIGHT, NITROGENOUS ACRYLATE POLYMERS

Joseph E. Fields, Dayton, and George L. Wesp, Englewood, Ohio, assignors to Monsanto Chemical Company, St. Louis, Mo., a corporation of Delaware No Drawing. Application February 23, 1950, Serial No. 145,906

12 Claims. (Cl. 260—89.5)

The present invention relates to new polymerization products.

An object of the invention is to provide low-molecular weight, nitrogenous acrylate polymers. Another object of the invention is to provide polymeric products suitable for use as non-volatile plasticizers for vinyl chloride polymers.

These and other objects hereinafter disclosed are provided by the present invention wherein certain acrylates, or mixtures of certain acrylates with acrylonitrile, are subjected to polymerizing conditions in the presence of a solvent for the acrylic compounds comprising certain nitroalkanes. We have found that polymerization of the acrylic compounds in the nitroalkane solution yields low-molecular weight (less than 10,000) liquid or waxy polymeric materials containing a portion of the solvent in chemical combination. The products are addition polymers comprising one molecule of the nitroalkane per molecule of polymer.

The use of the nitroalkanes as solvents in the production of low-molecular weight, nitrogenous addition polymers from acrylates is surprising inasmuch as the polymerization of styrene in nitromethane solution yields solid polystyrenes containing no nitrogen (see Price and Durham, J. Amer. Chem. Soc. 65, 759 (1943)).

The nitrogenous, low-molecular weight polymers of the present invention are novel products which are advantageously employed as substantially non-volatile plasticizers for vinyl chloride polymers, such as polyvinyl chloride, vinyl chloridevinyl acetate copolymers, etc. The present polymers are also suggested for use as dielectric media, synthetic lubricants, etc.

According to our discovery, there are prepared new polymeric products having the general formula:

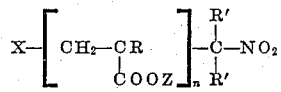

wherein $n$ is an integer of not more than 100, X is a member of the group consisting of hydrogen and halogen, Z is a member of the group consisting of alkyl, aryl, alkaryl, cycloalkyl and heterocyclic radicals, R is a member of the group consisting of hydrogen and the methyl radical and R' is a member of the group consisting of hydrogen and alkyl radicals of from 1 to 4 carbon atoms. Polymeric products having the above general formula are obtained by heating, in the presence of a polymerization catalyst, a mixture comprising an acrylate having the general formula:

$$CH_2:CR.COOZ$$

in which R and Z are as defined above, and a nitroalkane having the general formula:

in which X and R' are as defined above.

Illustrative of acrylates useful for the present purpose are the following: the esters of acrylic or methacrylic acid with unsubstituted, saturated, aliphatic alcohols of from 1 to 6 carbon atoms, e. g., methyl acrylate, isobutyl acrylate, n-hexylacrylate, ethyl methacrylate, isoamyl methacrylate and propyl methacrylate; the esters of acrylic or methacrylic acid with phenols or aralkyl alcohols such as phenol, β-naphthol, 4-nitrophenol, 2,4-dichlorophenol, 4-methoxyphenol and benzyl alcohol; the esters of acrylic or methacrylic acid with alicyclic or heterocyclic alcohols such as cyclohexanol, hydroxythiophene and tetrahydrofurfuryl alcohol, etc.

Nitroalkanes with which the above esters are reacted include nitromethane, nitroethane, 1- or 2-nitropropane, the mononitro derivatives of n-butane and isobutane, and of the straight- and branched-chain pentanes, hexanes, heptanes and nonanes or mixtures of commercially available petroleum fractions containing these paraffins. The halogenated nitroalkanes, e. g., 2-chloro-2-nitropropane, 1-chloro-1-nitropropane, bromonitroethane, and 2-iodo-2-nitro-n-butane, are of particular importance. For addition to occur, the nitroalkane should have at least one labile hydrogen atom, or at least one labile halogen atom attached to the nitro-bearing carbon atom.

For some specific purposes, particularly for the production of polymeric materials of very good dielectric properties, it is advantageous to include acrylonitrile as a ternary component in the mixture of acrylate and nitroalkane. Any proportion of acrylonitrile to acrylate may be used, these monomers being copolymerized with each other in all proportions to form a linear polymer chain which is terminated before it reaches a molecular weight of, say, 10,000 by addition of one molecule of the nitroalkane to the copolymer chain. Also, instead of acrylonitrile, any monomer copolymerizable with the acrylates or methacrylates may be employed.

The ratio of monomer, i. e., the acrylate or the acrylateacrylonitrile mixture to the nitroalkane is comparatively unimportant, for even in the presence of a large excess of the nitroalkane, only one molecule of the nitro compound adds to the polymer molecule. However, the average molecular weight of the product decreases with increasing dilution of the monomers. While, undoubtedly it is the nitroalkane which is responsible for maintaining the average molecular weight of the final polymer product to below 10,000, the polymerizing conditions otherwise employed also contribute to the actual molecular weight of the nitrogenous polymeric acrylate. Here, as in known polymerization reactions, temperature and the nature and concentration of the catalyst used, all have an effect on the type of product obtained. The nitroalkanes comprise still another and hitherto unused control in the production of tailored molecules, these nitro compounds being apparently responsible for termination, before an average molecular weight value of 10,000 is attained, of linear chains which had been prompted by the other polymerizing factors, i. e., temperature and catalyst.

The product is a mixture of polymer chains containing a terminal nitro group as shown in the formula herein given and from 2 to 100 acrylate units.

The polymerization addition reaction of the present invention is generally carried out as follows: The acrylate or the mixture of acrylate and other monomer copolymerizable therewith is dissolved in the nitroalkane, a polymerization catalyst is added, and the mixture is heated until formation of the desired polymer, the formation of which may be experimentally established at first by viscosity determinations during the polymerization. Inasmuch as the actual temperature employed is a function of the nature of the monomer and the catalyst as well as of the properties desired in the final product, no specific heating conditions can be prescribed, except to state that a temperature of over ordinary room temperature, i. e., of over 25° C. and below the decomposition point of the reactants is useful. The generally known polymerization catalysts, and particularly acidic peroxides such a benzoyl peroxide or acetyl peroxide, alkali persulfates, etc., are employed in concentrations which have been previously found to promote polymerization reactions, i. e., in concentrations of from, say, 0.01 to 5.0 per cent by weight of the monomeric material.

In making low-molecular polymers which are to be used plasticizers for vinyl chloride polymers, we prefer to heat the nitroalkane solution of the acrylate at a temperature of from 80° C. to 110° C. for a time of from 36 to 48 hours in the presence of 5.0 per cent by weight of an acidic peroxide such as benzoyl peroxide. Operating in this manner, we obtain nitrogenous polymers having a molecular weight of from 1,000 to 6,000 and a nitrogen content of from 0.10 per cent to 5.0 per cent, depending upon the individual reactants employed and the specific polymerizing conditions to which they were subjected.

The invention is further illustrated, but not limited, by the following examples:

Example 1

A mixture consisting of 30 g. (0.3 mole) of distilled ethyl acrylate, 80.2 g. (0.9 mole) of 2-nitropropane, and 1.5 g. (5.0 per cent of the weight of the acrylate) of benzoyl peroxide was placed in a bottle, the bottle was sealed and placed on a rotating rack (43 R. P. M.) which was maintained for a time of 40 hours at a temperature of from 95° C. to 100° C. At the end of that time the unreacted 2-nitropropane was removed from the reaction mixture by distillation. The residue obtained after distilling to 160° C./5 mm. was 31.6 g. of an amber viscous liquid, and analyzing as follows:

Per cent C: 59.78, 59.59
Per cent H: 8.04, 8.12
Per cent N: 0.81, 0.72

Based on the nitrogen content of the product, the molecular weight of the viscous polymer was 1,819, and its composition corresponded to 17.3 moles of ethyl acrylate per mole of 2-nitropropane.

This 17.3:1.0 ethyl acrylate-nitropropane addition polymer was evaluated for use as an extending plasticizer with dioctyl phthalate in VYNW vinyl chloride-vinyl acetate copolymer, employing the following procedure:

A mixture consisting of 150 parts by weight of VYNW vinyl chloride-vinyl acetate copolymer, 50 parts by weight of dioctyl phthalate and 50 parts by weight of the nitrogenous acrylate polymer of this example was worked on a rolling mill to a homogeneous blend. A molded test specimen of the resulting milled product was tested for volatility characteristics by maintaining the specimen at a temperature of 105° C. for a time of 48 hours. At the end of this time the sample was allowed to cool and then weighed. There was thus determined a 2.05 per cent loss in the weight of the product. A similarly blended and molded test specimen of the same vinyl chloride polymer plasticized only with dioctyl phthalate (150 parts VYNW, 100 parts dioctyl phthalate) gave a volatility value of 3.76 per cent by the same testing procedure.

The present nitrogenous polymeric acrylate can also be advantageously employed as the sole plasticizer with vinyl chloride-vinyl acetate copolymers or with copolymers of vinyl chloride and other monomers, e. g., vinylidene chloride, methyl methacrylate, vinyl ethers, etc. The addition polymers of the present invention are generally useful as plasticizers or plasticizer extenders with resinous compositions comprising a copolymer of at least 70 per cent by weight of vinyl chloride and up to 30 per cent by weight of an unsaturated monomer copolymerizable therewith. Also, good results are obtained when blending the present low-molecular weight nitrogenous acrylates with plasticizers other than dioctyl phthalate, e. g., tricresyl phosphate.

Example 2

This example is like Example 1, except that 0.3 mole (38.4 g.) of butyl acrylate was used instead of ethyl acrylate. There was thus obtained 38.9 g. of an amber, viscous polymerization product analyzing as follows:

Per cent C: 66.32, 66.36
Per cent H: 9.56, 9.58
Per cent N: 0.25, 0.25

Based on the analysis, the molecular weight of the polymeric material is 5603, and its composition corresponds to 43 butyl acrylate units to one 2-nitropropane unit. Evaluation of this nitrogenous, low molecular-weight polymer as a plasticizer for VYNW vinyl chloride-vinyl acetate copolymer gave a volatility value of 1.86 per cent as against the 3.76 per cent obtained for the 150:100 VYNW: dioctyl phthalate molded test specimen.

Example 3

Two bottles each of which contained a mixture consisting of 0.24 mole (30.8 g.) of n-butyl acrylate, 0.06 mole (3.2 g.) of acrylonitrile, 0.9 mole (111.2 g.) of 2-chloro-2-nitropropane and 1.70 g. of benzoyl peroxide (5.0 per cent by weight of monomers) were placed in a rotating rack as in Example 1 and maintained at a temperature of from 95° C. to 100° C. for a period of 40 hours. At the end of this time the contents of the two bottles were combined. Removal of the unreacted components, B. P. up to 160° C./5 mm. Hg pressure gave 66.2 g. of residue, a very dark, viscous liquid which analyzed as follows:

Per cent C: 65.93, 65.91
Per cent H: 8.36, 8.19
Per cent N: 2.87, 2.84
Per cent Cl: 0.85, 0.84

The molecular weight of the product, based on the chlorine analysis was 4171 and its composition corresponded to 28.45 n-butyl acrylate : 7.53 acrylonitrile : 1.0 2-chloro-2-nitropropane.

Evaluation of the present product as a plasticizer employing the procedure of Example 1 gave a volatility value of 2.09 per cent.

Example 4

A mixture consisting of 0.24 mole (30.8 g.) of n-butyl acrylate, 0.06 mole (3.2 g.) of freshly distilled acrylonitrile, 0.9 mole (80.2 g.) of 2-nitropropane and 1.70 g. (5 per cent by weight of the monomers) was heated at a temperature of from 95° C. to 100° C. for a period of 40 hours. During this time, the reaction mixture was agitated as in Example 1. Removal of the unreacted components gave a residue (33.9 g.) of an amber, viscous liquid. Analysis of this product gave the following values:

Per cent C: 65.97, 65.85
Per cent H: 8.80, 8.61
Per cent N: 2.74, 2.75

Based on the analysis of the copolymer of Example 3, the molecular weight of the present product is 4120 and its composition corresponds to 28.5 butyl acrylate : 7.1 acrylonitrile : 1.0 2-nitropropane.

Evaluation of the present product as a plasticizer employing the procedure of Example 1 gave a volatility value of 2.31 per cent.

Example 5

Employing the procedure of Example 3, two bottles, each of which contained a mixture consisting of 0.3 mole (30 g.) of ethyl acrylate, 0.9 mole (111.2 g.) of 2-chloro-2-nitropropane and 1.50 g. of benzoyl peroxide were placed in a rotating rack and heated. After removing unreacted material from the combined runs there was obtained 60.6 g. of a very dark, viscous liquid which analyzed as follows:

Per cent C: 59.44, 59.83
Per cent H: 7.74, 7.89
Per cent N: 0.37, 0.39
Per cent Cl: 1.24, 1.32

Based on the above chlorine value, the molecular weight of the product is 2770, and its composition corresponds to 26.4 ethyl acrylate : 1.0 2-chloro-2-nitropropane.

Evaluation of the present product as a plasticizer employing the procedure of Example 1 gave a volatility value of 2.31 per cent.

Example 6

Operating as in Example 5 but using n-butyl acrylate (0.3 mole, 38.4 g.) instead of ethyl acrylate, there was obtained 60.6 g. of a very dark, viscous liquid which analyzed as follows:

Per cent C: 65.28, 64.99
Per cent H: 9.14, 9.18
Per cent N: 0.29, 0.25
Per cent Cl: 0.80, 0.75

The molecular weight of this product based on the chlorine content was 4546 and its composition corresponded to 34.5 butyl acrylate : 1.0 2-chloro-2-nitropropane. Its volatility value, tested as in Example 1, was found to be 2.16 per cent.

When blended in the formula:

150 parts by weight of VYNW vinyl chloride-vinyl acetate copolymer
50 parts by weight of dioctyl phthalate
50 parts by weight of low-molecular weight acrylate the nitrogenous acrylate polymers of Examples 1 to 6 possess better compatibility than low-molecular weight polymers prepared by polymerizing the same acrylates in solvents other than the nitroalkanes. The strength properties of vinyl chloride-vinyl acetate copolymers plasticized with the present nitrogenous polymers are much better than those of similar blends obtained by using prior solution polymerized acrylates.

Example 7

A greater quantity of the polymer of Example 4 was prepared by polymerizing 16 charges of the mixture of Example 4 according to the procedure described therein. At the end of the polymerization time, the charges were combined and unreacted material was removed from the whole by distilling up to a temperature of 150° C. at a Hg pressure of 8 to 10 mm. There was thus obtained 1063.2 g. of a nitrogenous, viscous polymer which had the properties of the product of Example 4. Testing of the present product for electrical properties at 1000 cycles (85° C.) gave a dielectric constant value of 7.9. The present materials, therefore, may be advantageously employed for use as dielectric media in the manufacture of capacitors.

The uses to which the present low-molecular weight nitrogenous acrylate polymers can be put depend upon the nature of the monomer and the nitroalkane employed. Using the higher alkyl acrylates instead of the ethyl or butyl acrylates of the present example, there are obtained, particularly when the higher nitroalkanes are substituted for the nitropropanes of the examples, viscous to waxy nitrogenous polymers which may be used in polishing and coating compositions. The aryl acrylates, e. g., esters like dichlorophenyl acrylate or the xenyl acrylates yield products which are suggested for use as heat transfer media. The low-molecular weight nitrogenous polymer prepared by polymerizing tetrahydrofurfuryl acrylate in a nitroalkane such as 1-nitropentane is of general interest as a plasticizer. The product from cyclohexyl methacrylate is a possible synthetic lubricant. Generally, all of the polymeric products may be hydrolyzed to materials having a plurality of free carboxy groups and subsequently reacted with amino- or hydroxy-containing compounds to yield resins, surface-active agents, water-repellents, etc.

The polymerization procedure employed for the preparation of the present addition polymers may be widely varied. Ordinarily, no extraneous diluent need be employed, but when working with normally solid materials, the use of an added solvent or diluent may be advantageous. The polymerization may be effected in water emulsion, instead of in solution, employing generally known emulsion polymerization techniques.

While the examples given above are limited to the use of an acrylate or a mixture of an acrylate and acrylonitrile as the polymerizable monomeric components, any monomer which is known to copolymerize with polymerizable acrylates or methacrylates may be employed in the preparation of the low-molecular weight nitrogenous polymers of the present invention, for example vinyl chloride, vinyl acetate, vinyl ethers, styrene, butadiene, etc. Two or more different acrylates may be employed. Likewise, the nitroalkane used may be a mixture of commercially available, nitrated paraffins.

We claim:

1. A process for the preparation of polymeric products having the formula

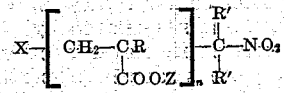

wherein $n$ is an integer of not more than 100, X is a member of the group consisting of hydrogen and halogen, Z is a member of the group consisting of alkyl, aryl, alkaryl, cycloalkyl and heterocyclic radicals, R is a member of the group consisting of hydrogen and the methyl radical, and R' is a member of the group consisting of hydrogen and alkyl radicals of from 1 to 4 carbon atoms, which comprises heating, in the presence of a polymerization catalyst, a mixture comprising an acrylate having the formula $$CH_2:CR.COOZ$$

in which R is a member of the group consisting of hydrogen and a methyl radical and Z is a member of the group consisting of alkyl, aryl, alkaryl, cycloalkyl and heterocyclic radicals and a nitroalkane of from 1 to 9 carbon atoms and having attached to the nitro-bearing carbon a member of the group consisting of hydrogen and halogen 2. The process of claim 1 further defined in that the polymerization catalyst is an organic peroxide.

3. The process of claim 1 further defined in that the polymerization catalyst is benzoyl peroxide.

4. A process of preparing polymeric products which comprises heating, in the presence of a polymerization catalyst, a mixture comprising an acrylic compound having the formula $$CH_2:CR.COOZ$$

wherein R is a member of the group consisting of hydrogen and the methyl radical, and Z is a member of the group consisting of alkyl, aryl, alkaryl, cycloalkyl and heterocyclic radicals, and a nitroalkane of from 1 to 9 carbon atoms and having attached to the nitro-bearing carbon a member of the group consisting of hydrogen and halogen, until said polymeric products are formed and isolating said products.

5. A process of preparing polymeric products which comprises heating, in the presence of a polymerization catalyst, a mixture consisting of an acrylic compound having the formula $$CH_2:CR.COOZ$$

wherein R is a member of the group consisting of hydrogen and the methyl radical, Z is a member of the group consisting of alkyl, aryl, alkaryl, cycloalkyl and heterocyclic radicals; acrylonitrile; and a nitroalkane of from 1 to 9 carbon atoms and having attached to the nitro-bearing carbon a member of the group consisting of hydrogen and halogen, until said polymeric products are formed and isolating said products.

6. A process of preparing polymeric products which comprises heating, in the presence of a polymerization catalyst, a mixture comprising an ester of acrylic acid and an unsubstituted, saturated aliphatic alcohol of from 1 to 6 carbon atoms, and a nitroalkane of from 1 to 9 carbon atoms and having attached to the nitro-bearing carbon a member of the group consisting of hydrogen and halogen, until said polymeric products are formed and isolating said products.

7. A process of preparing polymeric products which comprises heating, in the presence of a polymerization catalyst, a mixture comprising 2-nitropropane and an acrylic compound having the formula $$CH_2:CR.COOZ$$

wherein R is a member of the group consisting of hydrogen and the methyl radical and Z is a member of the group consisting of alkyl, aryl, alkaryl, cycloalkyl and heterocyclic radicals, until said polymeric products are formed and isolating said products.

8. A process of preparing polymeric products which comprises heating, in the presence of a polymerization catalyst, a mixture comprising 2-nitropropane and an ester of acrylic acid with an unsubstituted, saturated, aliphatic alcohol of from 1 to 6 carbon atoms, until said polymeric products are formed and isolating said products.

9. A process of preparing polymeric products which comprises heating, in the presence of a polymerization catalyst, a mixture comprising n-butyl acrylate and 2-nitropropane, until said polymeric products are formed and isolating said products.

10. Polymeric products having the formula

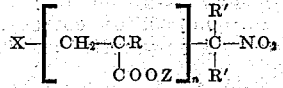

wherein $n$ is an integer of not more than 100, X is a member of the group consisting of hydrogen and halogen, Z is a member of the group consisting of alkyl, aryl, alkaryl, cycloalkyl and heterocyclic radicals, R is a member of the group consisting of hydrogen and the methyl radical and R' is a member of the group consisting of hydrogen and alkyl radicals of from 1 to 4 carbon atoms.

11. A viscous mixture of compounds having the formula

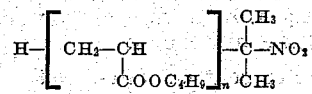

in which $n$ is an integer of not more than 50.

12. A viscous mixture of compounds having the formula

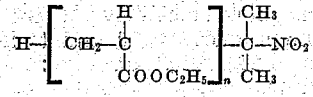

in which $n$ is an integer of not more than 50.

JOSEPH E. FIELDS.
GEORGE L. WESP.

REFERENCES CITED

The following references are of record in the file of this patent:

UNITED STATES PATENTS

| Number | Name | Date |
|---|---|---|
| 1,933,052 | Fikentscher et al. | Oct. 31, 1933 |
| 2,016,490 | Fikentscher | Oct. 8, 1935 |
| 2,192,583 | Bogin | Mar. 5, 1940 |
| 2,359,103 | Gerhart et al. | Sept. 26, 1944 |
| 2,417,294 | D'Alelio | Mar. 11, 1947 |